(12) United States Patent
Wright et al.

(10) Patent No.: US 7,889,663 B1
(45) Date of Patent: Feb. 15, 2011

(54) EVALUATION OF HANDOFF IN WIRELESS NETWORKS USING EMULATION

(75) Inventors: Charles R. Wright, Winchester, MA (US); Fanny I. Mlinarsky, Bolton, MA (US); John E. Ziegler, Westborough, MA (US)

(73) Assignee: Azimuth Systems, Inc., Acton, MA (US)

( * ) Notice: Subject to any disclaimer, the term of this patent is extended or adjusted under 35 U.S.C. 154(b) by 1534 days.

(21) Appl. No.: 11/179,884

(22) Filed: Jul. 12, 2005

(51) Int. Cl.
*H04W 28/00* (2006.01)

(52) U.S. Cl. .................. 370/241; 455/425; 455/436

(58) Field of Classification Search .............. 370/241, 370/244; 455/436, 67.11, 67.12, 67.13, 67.14, 455/425
See application file for complete search history.

(56) References Cited

U.S. PATENT DOCUMENTS 6,438,357 B1 * 8/2002 Oh et al. ................... 455/67.14
6,571,082 B1 * 5/2003 Rahman et al. ............ 455/67.11

* cited by examiner

*Primary Examiner*—Seema S Rao
*Assistant Examiner*—Mon Cheri S Davenport
(74) *Attorney, Agent, or Firm*—Anderson Gorecki & Manaras LLP

(57) ABSTRACT

Test equipment operable to evaluate handoff in wireless networks can be configured as an infrastructure test system or a client mobility test system. The infrastructure test system includes a plurality of client emulating devices and a client motion emulator for testing real access points. Each client emulating device is operable to emulate multiple individual virtual mobile devices ("virtual mobile devices"). The client motion emulator computes a mathematical representation of the modeled network and motion of virtual mobile devices in that network. The client motion emulator employs the mathematical representation to calculate path loss between virtual mobile devices and the real access points in the modeled network. The calculated path loss information is transmitted to the virtual mobile devices. Path loss of communications from a virtual mobile device to an access point is implemented via a programmable attenuator.

68 Claims, 8 Drawing Sheets

EVALUATION OF HANDOFF IN WIRELESS NETWORKS USING EMULATION

FIELD OF THE INVENTION

This invention relates generally to the field of test equipment, and more particularly to test equipment operable to evaluate handoff in wireless networks.

BACKGROUND OF THE INVENTION

Wireless Local Area Networks ("WLANs") enable communications via mobile devices such as laptop computers. However, the tools and methods for testing WLANs and associated mobile devices have not matured at the same pace as those associated with wired technologies such as Ethernet. One factor that contributes to this situation is that wireless devices tend to be more complex than comparable wired systems because the wireless medium is inherently unreliable. Further, testing wireless networks requires special considerations to avoid interference from other wireless systems not involved in the test. Further, WLAN protocols have not yet fully matured, and are often in a state of flux because of ongoing standards activities.

One of the most difficult WLAN functions to test is handoff (sometimes referred to as "roaming"). Because WLAN clients are typically mobile, it is possible for a WLAN client to move out of range of the access point with which it is communicating. When this occurs the client must switch its association to another access point, if the client moves into range of another access point. Disassociating with one access point in favor of another access point is referred to as "handoff." Current methods for testing handoff include open air testing, connecting the wireless equipment through cables, and assembling test setups in RF-shielded rooms. However, the current methods are impractical for testing handoff in complex WLANs in which many devices may simultaneously be in motion, and this is a problem.

The need for a solution to the problem of testing handoff in complex WLANs has recently become more acute due to proposals to support voice communications on WLANs. For example, the IEEE 802.11™ Working Group is presently working to further enhance the standard by adding features designed to facilitate handoff by decreasing time required for handoff. This feature is intended to enable wireless LANs to support voice handsets and other multimedia streaming applications. Further, because the coverage area for an access point in a WLAN is relatively small, handoffs can occur frequently. Therefore, there is a need to test handoff in complex WLANs in which many devices may be simultaneously in motion.

SUMMARY OF THE INVENTION

In accordance with one embodiment of the invention, apparatus operable to emulate handoff to test at least one Device Under Test in a System Under Test, includes: at least one test device, each test device operable to emulate operation of a plurality of wireless client devices, thereby providing virtual mobile devices; and a motion emulator including a memory with a representation of the System Under Test including, for each virtual mobile device, a model of the distance between the virtual mobile device and each Device Under Test, and a model of motion of the virtual mobile device relative to each Device Under Test, the motion emulator being operable to calculate, for each Device Under Test, an indication of path loss to be applied to communications between the virtual mobile device and the Device Under Test attributable to the modeled distance and modeled motion, and to transmit the indication of path loss to at least one test device, the test device being operable in response to the indication of path loss to apply the path loss to communications between the virtual mobile device and the Device Under Test.

In accordance with another embodiment of the invention, apparatus operable to evaluate handoff to test at least one Device Under Test in a System Under Test, includes: a plurality of test devices, each test device operable to emulate operation of a plurality of wireless access points, thereby providing virtual access points; and a motion emulator including a memory with a representation of the System Under Test including, for each virtual access point, a modeled distance between that virtual access point and each Device Under Test, and a modeled motion of that virtual access point relative to each Device Under Test, the motion emulator being operable to calculate, for each Device Under Test, an indication of path loss to be applied to communications between that Device Under Test and the virtual access point attributable to the modeled distance and modeled motion, and to transmit the indication of path loss to at least one test device, the test device being operable in response to the indication of path loss to apply the path loss to communications between that Device Under Test and the virtual access point.

In accordance with another embodiment of the invention, apparatus operable to emulate device behavior to test at least one Device Under Test in a System Under Test, includes: at least one test device, each test device operable to emulate behavior of at least one wireless client device; and at least one programmable emulator that allows a user to specify behavior of the emulated wireless client device.

One advantage of certain embodiments of the invention is improved scalability. Testing a wireless network using actual devices is subject to the "$N^2$ problem." In particular, the number of RF paths in a cabled test environment is equal to the number of clients times the number of access points. The number of RF paths is a problem because it grows so quickly, and a network having a significant number of access points and clients may be desirable or even necessary for testing purposes. The present invention mitigates the $N^2$ problem because each test device is operable to simultaneously emulate the position and motion of multiple virtual devices such as clients and access points. In particular, each test device can selectively activate any combination of MAC addresses. Consequently, the apparatus can be scaled by simply changing the number of virtual mobile devices in each test device.

Another advantage of certain embodiments of the invention is improved testing when communications are encrypted. In particular, the emulated devices actively participate in handoff with full knowledge of encryption keys, and are programmed to directly timestamp the start and finish of a handoff, as well as all intermediate steps. In this way, the precise start and finish of a handoff are clearly determined in a manner that is impractical in a passively monitored test.

DETAILED DESCRIPTION

Figure 1:
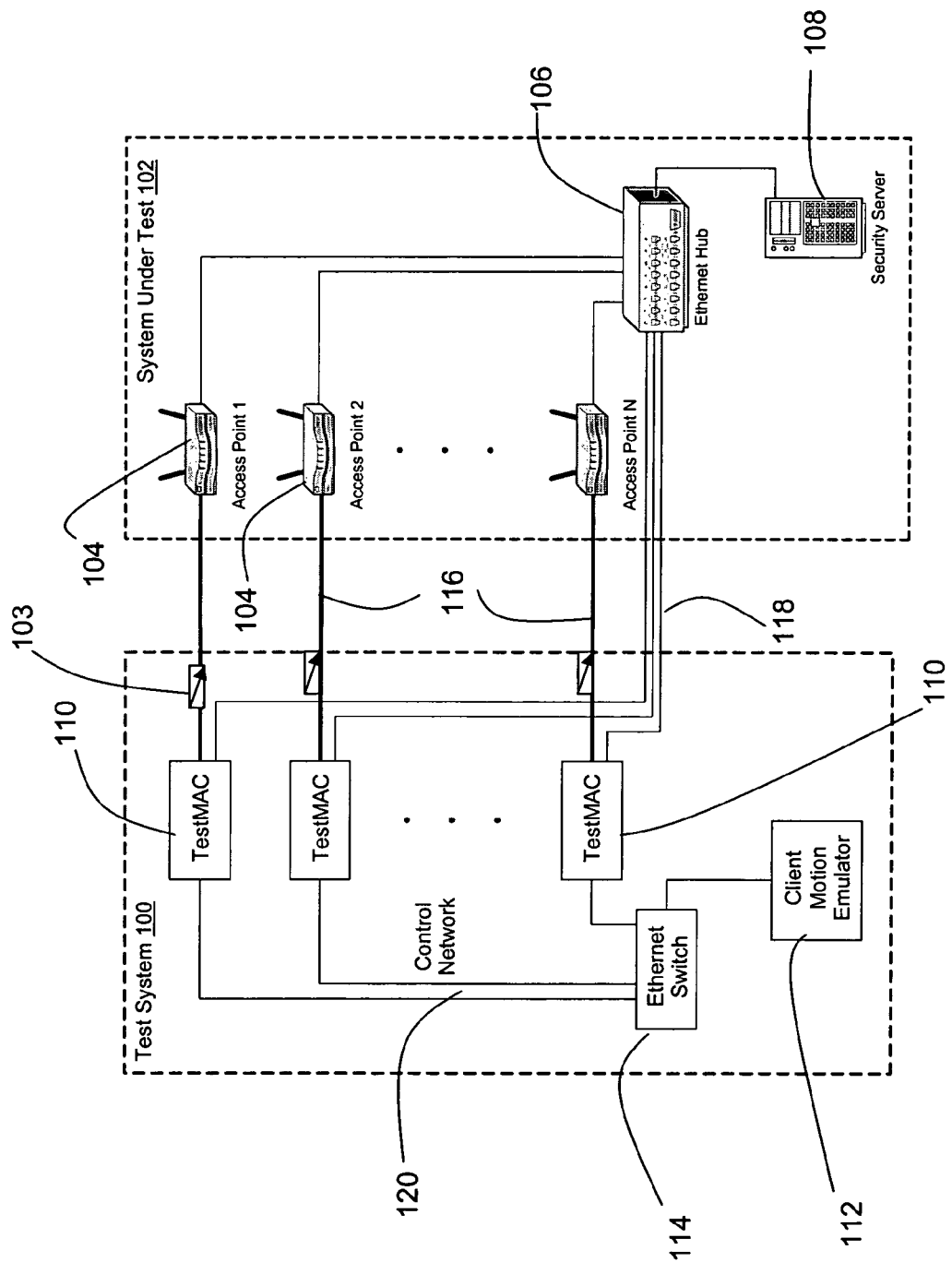
FIG. 1 illustrates a test system that evaluates handoff for infrastructure testing.

FIG. 1 illustrates a test system (100) that is operable to evaluate handoff in order to test infrastructure in a System Under Test ("SUT") (102). The illustrated SUT includes wireless Access Points 1-N ("APs") (104) in communication with an Ethernet hub (106), which in turn is in communication with a security server (108). The test system (100) includes testMACs 1-N (110), one for each AP (104) in the SUT, a Client Motion Emulator ("CME") (112) and an Ethernet hub (114). In particular, there is one testMAC for each access point, and only one testMAC is in direct communication with any one access point. The APs (104) may be disposed in separate, shielded enclosures and interconnected with the test system and Ethernet hub via wired connections. In particular, wired RF signal paths (116) are employed between APs and corresponding testMACs, and wired Ethernet (118) is employed between the Ethernet hub (106), APs (104) and testMACs (110).

The Client Motion Emulator ("CME") (112) includes a software representation of the modeled physical position of the APs (104) and the emulated motion of virtual mobile devices relative to those APs. The software representation is employed to produce a simulated time-variable value of path loss between each emulated client and each AP. The CME (112) may perform this function by computing path loss in real time based on the modeled position, characteristics and motion of clients and APs over time. Path loss information computed by the CME (112) is sent to the testMACs (110). The clients may be data or voice clients.

Path loss can be modeled by the CME (112) using various different techniques which are not critical to the invention. For instance, a simple "free space loss" model that does not account for RF obstructions might be employed. Alternatively, a path loss model which accounts for RF absorption, reflection and diffraction by obstructions such as walls, as well as the free space loss might be employed. The modeled physical layout, position and RF absorption characteristics of obstructions can be included in the software representation of the network maintained by the CME. During operation, a ray trace model could be used to compute an estimate of the path losses for each communication link. The flexibility in selecting a path loss model may be beneficial because different users and SUTs might have differing test criteria and needs.

Figure 2:
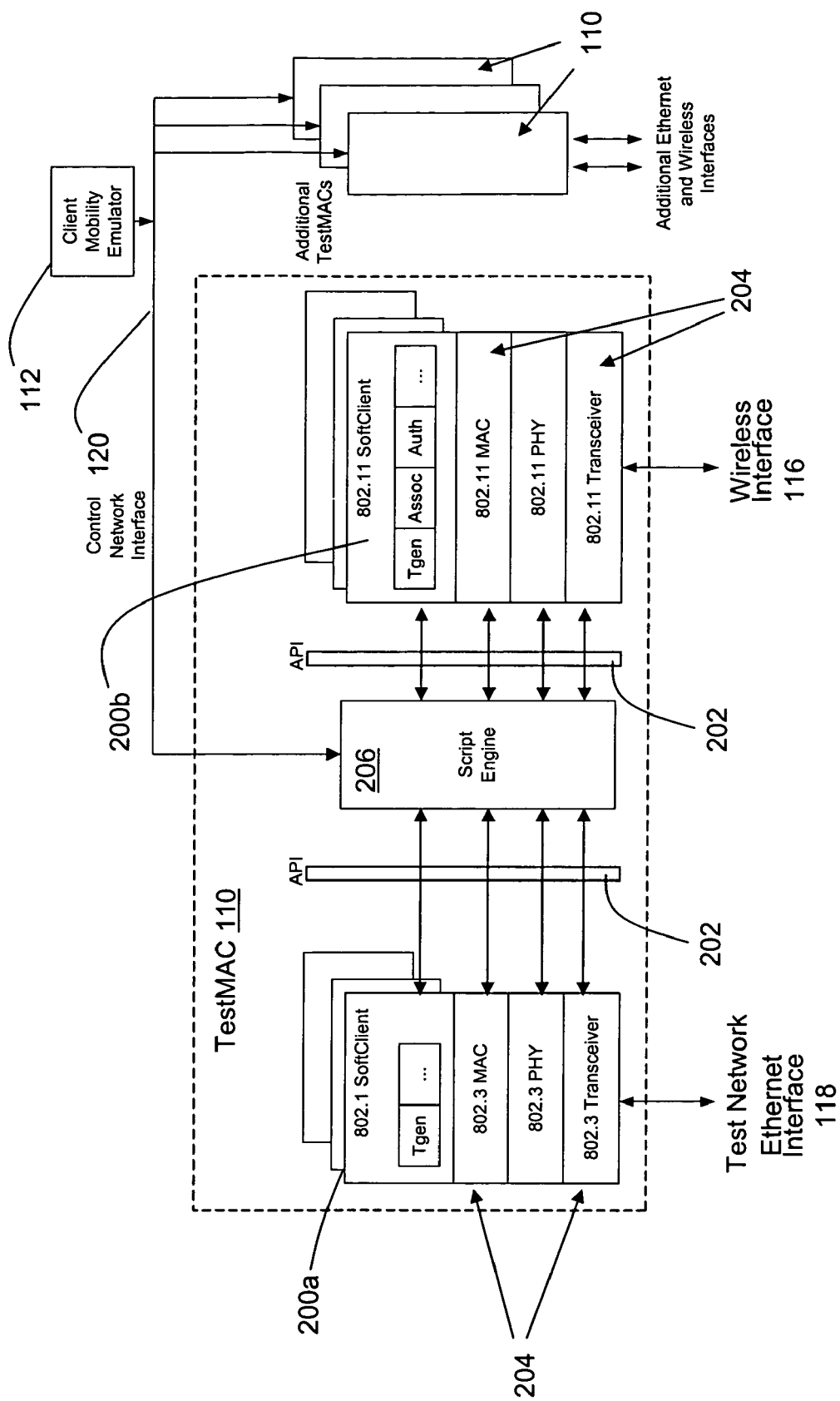
FIG. 2 illustrates a testMAC of FIG. 1 in greater detail.

Referring now to FIGS. 1 and 2, each testMAC (110) is operable in response to path loss and other information provided by the CME (112) to emulate client devices such as wireless phones, PDAs and laptop computers, i.e., provide virtual mobile devices (200). Operation of these virtual mobile devices for infrastructure testing is coordinated across all testMACs such that, from the perspective of the SUT (102), the virtual mobile devices can be made to appear to move from one AP (104) coverage area to another. These conditions are created by coordinated virtual positioning and MAC address activation/deactivation.

Virtual positioning is a technique by which the transmit and receive signal levels for a virtual mobile device are set at each testMAC in response to input from the CME to exhibit particular characteristics according to a desired virtual position for that virtual mobile device. Every testMAC is capable of processing test traffic as any one or ones of all of the virtual mobile devices. Accurately emulating the position and motion of each and every virtual mobile device therefore requires coordination of all testMACs. For each virtual mobile device, signal strength is calculated on a moment-by-moment basis for each testMAC. In some cases the signal strength may be zero, i.e., the virtual mobile device is inactive on the testMAC. In other cases the signal strength may be non-zero, i.e., the virtual mobile device is active on the testMAC. In the case where the signal strength is non-zero, as a virtual mobile device changes its virtual position relative to the APs in the SUT, the signal strength of transmissions to and from testMAC/AP pairs are re-calculated and implemented in a manner that simulates relative motion.

MAC addresses are also selectively activated and deactivated on the testMACs in order to emulate operation of client devices. Each virtual mobile device is assigned a unique MAC address. Each testMAC is operable to activate and deactivate, in any combination, the MAC addresses of every virtual mobile device of the Test System. Individual virtual mobile devices are activated or deactivated on each testMAC to make it appear that a single mobile device with its own unique MAC address has changed position or changed its channel. At any one time there is only one active virtual mobile device using a specific MAC address. Generally, a particular MAC address is only active on one testMAC at any given time. In particular, if the access points in the SUT each operate on a different channel, and the emulated client devices are only operable on one channel at any given time, then a MAC address can only be active on one testMAC at any given time.

In an alternative embodiment where it is desirable to emulate a duplicate MAC address, e.g., to observe reaction of the SUT under such an abnormal condition, a particular MAC address may be simultaneously active on more that one testMAC. Similarly, multiple access points could be configured to operate on the same channel to create an overlapping BSS by simultaneously activating a MAC address on more than one testMAC. For example, if access point 1 and access point 2 are operating on the same channel, a MAC address could be active on both testMAC 1 and testMAC 2 to emulate a condition whereby both APs hear the same client. In another alternative embodiment a testMAC simultaneously emulates traffic on multiple channels. In some implementations the APs in a SUT can hear clients that are not on their own channels even if they don't operate on these channels. Furthermore, the APs may also scan multiple channels and thus be able to pick up transmissions from clients in their proximity on any channel. Hence, testMACs may be made to transmit on multiple channels to more accurately emulate real world conditions where signals on multiple channels surround APs in a network.

Virtual relative motion is provided by coordinating virtual positioning and MAC address activation/deactivation. For example, the motion of a virtual mobile device from a first AP (AP 1) towards a second AP (AP 2) could be provided by decreasing the signal strength associated with a MAC address at a first testMAC (testMAC 1), following which the MAC address is activated at a second testMAC (testMAC 2), during which process the signal strength at the second testMAC is increased while the signal strength at the first testMAC is simultaneously decreased, and eventually the MAC address at the first testMAC is deactivated. Because each testMAC is operable to simultaneously emulate the position and motion of multiple virtual mobile devices, virtual positioning and MAC address activation/deactivation is coordinated among the testMACs for each virtual mobile device. One advantage of this architecture is that the test system can be scaled by simply changing the number of virtual mobile devices in each testMAC.

Each testMAC (110) is operable for each active virtual mobile device to represent a station, e.g., mobile phone, by providing services, and by sending and receiving traffic on RF pathways (116), e.g., IEEE 802.11 interface. Traffic transmitted on the RF pathways is indicative of operation of the modeled network. Ethernet pathways (118) may optionally be employed for management and to provide test traffic. The Ethernet pathway may also be useful for measuring throughput as a test metric. Alternatively the Ethernet pathways may not be used, or there may be only a single instantiation of Ethernet.

Application Programming Interfaces ("APIs") (202) provide access to wireless functionality at all levels within the protocol stack (204) of 802.3 and 802.11 virtual mobile devices. The APIs are used by a script engine (206) running within the testMAC to enable customization of various aspects of wireless network operation and testing. For example, the script engine and APIs may be employed to implement a user-selectable and user-programmable handoff protocol. Implementing the protocols using a script language enables simplified maintenance compared to embedded firmware because scripts can be easily updated to track pre-standard implementations and add support for new protocols.

The script engine (206) interfaces to the virtual mobile devices (200) and to various levels of the networking interfaces, including Ethernet interface (118), RF interface (116) and a control network interface (120). The script executing on the script engine (206) receives commands from the CME (112) over the testMAC's control network interface (120), thereby enabling the CME (112) to control multiple testMACs. The script engine is also used to provide coordinated operation of virtual mobile devices among multiple testMACs, as described above. The script engine can also pass commands and data back through the control interface (120). These commands and data may be directed to CME or to other testMACs for handoff simulation, as will be described in greater detail below.

Implementation of the signal strength computed by the CME may be either actual or virtual. Within each testMAC (110), signal levels associated with test communications are set in accordance with the signal level information received from the CME. In the illustrated embodiment the signals transmitted to the SUT (102) are attenuated with a programmable attenuator (103). However, signals received from the SUT are virtually attenuated. In particular, the signal strength of the received data unit, such as a frame, packet or cell, is calculated based on modeled distance, obstructions and other factors that affect attenuation. The attenuation may be represented as a scale factor. In operation, algorithms within the virtual mobile device (200) that monitor signal strength use the modeled signal strength such as the scale factor as input into handoff algorithms. When signal strength weakens below a threshold which may vary for different algorithms, the virtual mobile device initiates a roam. Virtual attenuation is particularly useful when testing handoff algorithms that model operation of real clients.

In order to provide more realistic and accurate emulation of real world conditions the testMAC (110) may drop data units based on the virtual receive signal strength. For example, if the virtual signal strength falls below a predetermined threshold then the testMAC causes that data unit to be dropped, thereby emulating the action that occurs when a data unit is received with errors. Further realism can be introduced by making the decision to drop a data unit a probabilistic function of the virtual received signal level. In particular, data units received with a given virtual received signal level would have a corresponding error probability. This might yield, for instance, a 10% chance of an error at a −82 dBm received signal level.

It should be noted that the Test System (100) may be configured to test overlapping BSSs. In particular, the testMACs can be configured to enable access points to detect signals from one another. In one embodiment access point 1 transmits a signal to its corresponding testMAC. The testMAC determines from path loss and other information provided by the CME that access point 2 would detect that signal in the modeled network. Hence, the testMAC corresponding to access point 1 transmits the signal to the testMAC corresponding to access point 2. The testMAC corresponding to access point 2 then transmits the signal to access point 2. Further, the testMAC causes the signal to be attenuated in accordance with path loss information provided by the CME such that the signal strength at access point 2 is equal to the signal strength at which the signal from access point 1 would have been received by access point 2 in the modeled network.

Figure 3:
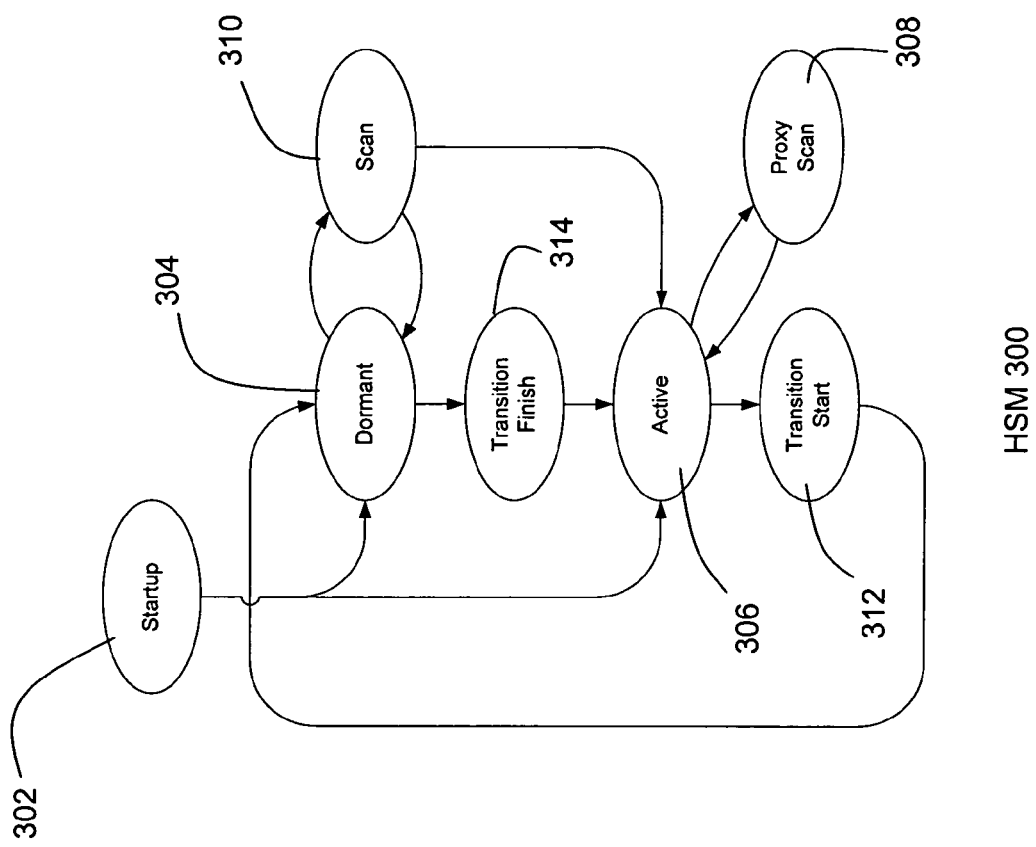
FIG. 3 illustrates one embodiment of the handoff state machine.

Referring now to FIGS. 1 through 3, a handoff state machine ("HSM") (300) is employed to implement a user-selectable and user-programmable handoff algorithm. An HSM is executed by the testMAC (110) for each virtual mobile device (200). In particular, for a given virtual mobile device every testMAC executes a selected HSM, although different virtual mobile devices may have different HSMs. Furthermore, each virtual mobile device participating in the handoff emulation maintains state for its HSM. The actual implementation of the HSM is dependent on the handoff algorithm itself, and can be created for different handoff algorithms. For example, one HSM might be created for a Nokia phone, a different HSM for a Motorola phone, etc. Further, a TestMAC can simultaneously execute different HSMs corresponding to different virtual mobile devices. Because of ongoing standardization efforts it is expected that multiple pre-programmed HSMs may be provided. However, the flexibility permitted by the script engine allows new algorithms defined by the end-user to be tested instead of being limited to the algorithms hard-coded by the manufacturer.

Figure 4:
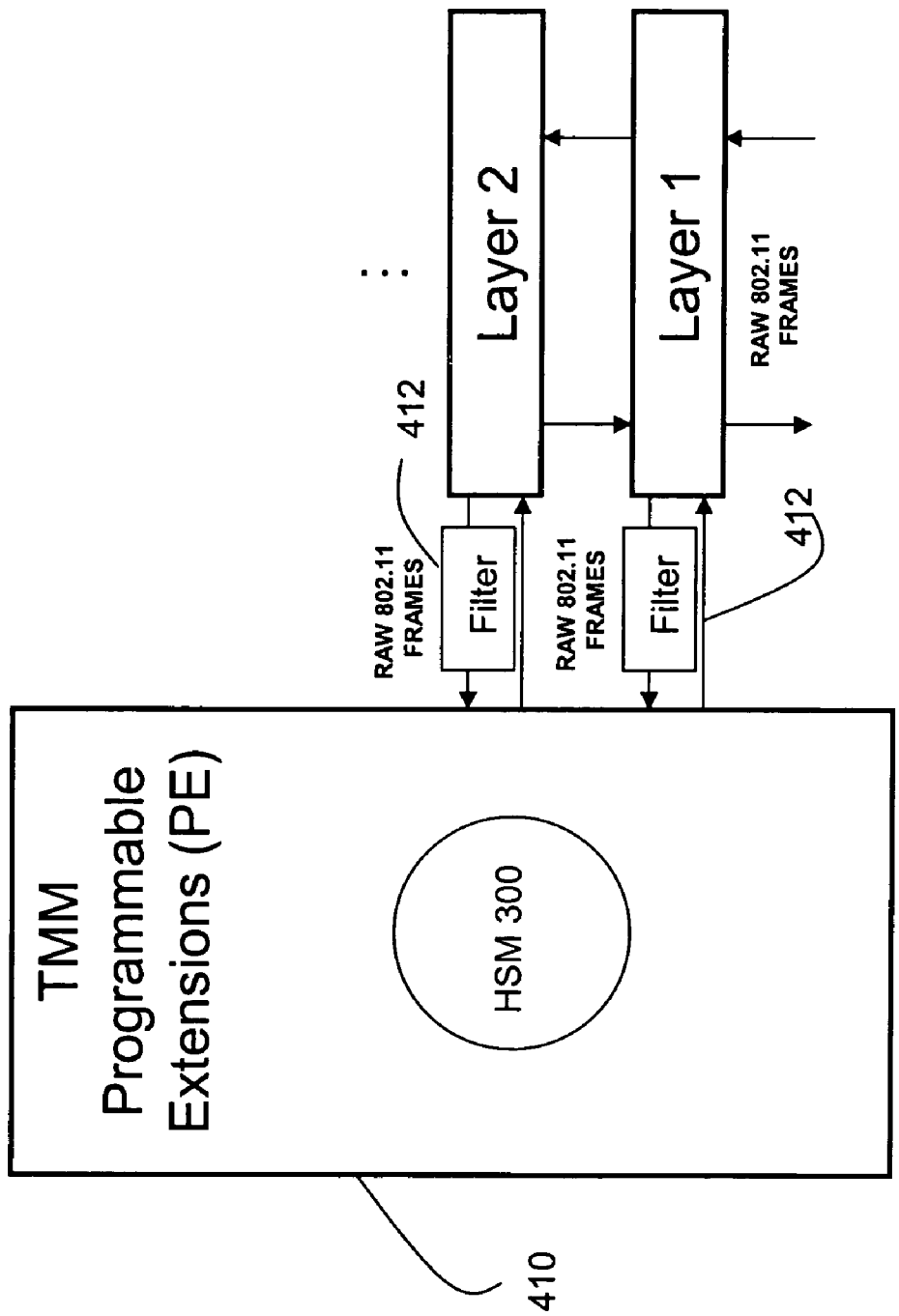
FIG. 4 illustrates use of user-programmable extensions.

Referring now to FIG. 4, each virtual mobile device may include user programmable extensions ("PE") (410), such as Tool Control Language ("TCL") script, which can be used to customize behavior of the virtual mobile device. Frames received from a real device, such as access point (104 FIG. 1) or originating in a higher layer of the testMAC are subjected to filters (412) which are operable to intercept frames at any layer of the protocol stack based on predetermined criteria. In particular, the selected frame is intercepted by the filter, and provided to the PE (410) where the frame can be changed, subsequent to which the changed frame can be reinserted into the protocol stack or consumed by the PE. The protocol stack includes default 802.11 software state machines which perform basic functions which need not be altered. However, user-programmable, i.e., arbitrary, state machines can be implemented in the PE (410). For example, the HSM (300) can be implemented in the PE. Some functions which a user may manage via the PE include processing of management and control frames, and ACKs. The PE enables the user to configure the test system to function in accordance with a selected protocol.

Figure 5:
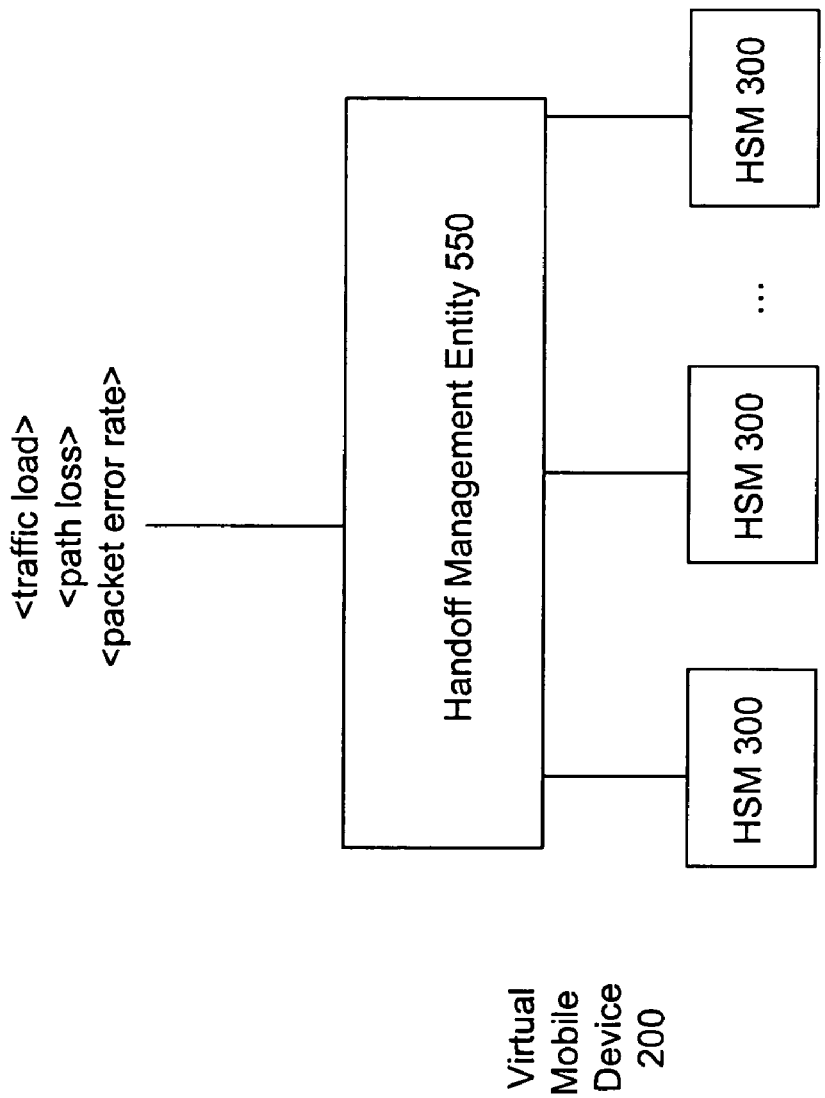
FIG. 5 illustrates a virtual mobile device.

Referring now to FIGS. 1, 2 and 5, each virtual mobile device (200) includes a handoff management entity (550) and a plurality of HSMs (300). In particular, the virtual mobile device includes one HSM (300) for each testMAC (110). The handoff management entity is operative in response to inputs such as traffic load, path loss and packet error rate from the CME (112) to facilitate and coordinate operation of the HSMs by prompting actions such as probe requests and handoff. The HSM may use API (202) primitives to create the 802.11 management, data'and control frames required to implement a selected protocol. The HSMs can also respond to events generated by airlink, timer and testMAC Ethernet control interface.

Referring now to FIGS. 1 through 5, the illustrated HSM embodiment depicts one possible HSM implementation consistent with current handoff protocol. All virtual mobile devices begin in a Startup state (302) when the handoff emulation system starts running. Each virtual mobile device then proceeds to either the dormant state (304) or active state (306), depending on prior configuration. Those in the Active state become active participants in network traffic, for instance by initiating voice calls and transmitting or receiving the resulting data traffic, and monitoring the link state, i.e., strength of AP signal, and AP traffic loading. Those virtual mobile devices in the Dormant state remain in that state until a command is received to change state. The command may be, for example, a command to scan issued by another testMAC. While in the Active state, the HSM for a virtual mobile device monitors the current link state and will initiate scanning on other RF channels. Scanning on other channels is emulated by the system using virtual mobile devices on two different testMACs, with the following procedure:

1) The handoff state machine for the virtual mobile device switches from the Active state (306) to the Proxy Scan state (308) in response to input from the handoff management entity (550).

2) The active virtual mobile device transmits a frame to the AP in which the Power Management bit is set, indicating to the AP that the virtual mobile device is in an active state and that the AP should buffer any traffic destined for the virtual mobile device.

3) The handoff management entity (550) directs the active virtual mobile device to send a Scan Request command through the control network interface to its corresponding (having the same MAC address) inactive virtual mobile device ("shadow virtual mobile device") on another testMAC selected by the handoff management entity.

4) Having received the Scan Request message, the shadow virtual mobile device switches to the Scan state (310) to determine the existence, link quality and loading of any APs that might be present. It should be noted that there may be more than one shadow clients, each on a different channel, and each will need its own transmit attenuator setting based on the computed position with respect to the APs that are within its range.

5) After executing the Scan Request command, the shadow virtual mobile device forwards the results back to the active virtual mobile device via the handoff management entity, and returns to the Dormant state (304).

6) After receiving the result of the scan and adding the results to its AP information base, the active virtual mobile device returns to the Active state (306) and resumes network traffic. In doing so, all data frames now transmitted by the active virtual mobile device will have the Power Management bit set to zero, indicating to the AP that the active virtual mobile device is ready to receive traffic at any time.

Those skilled in the art will appreciate that the process can be repeated on all testMACs.

The above procedure exemplifies the MAC address activation/deactivation technique. Generally, no two virtual mobile devices are ever using the same MAC address at exactly the same time (unless explicitly done so for test purposes to evaluate SUT behavior under duplicate-MAC-address conditions), which could potentially cause trouble in the network. Further, the MAC addresses are unique among operating network devices. It should be noted that the scan may involve more than two APs and is typically done on all the channels on which the virtual device is operable.

If conditions degrade on the current channel, the frequency of proxy scans may increase. If channel conditions degrade sufficiently, the virtual mobile device will handoff to a different channel. Like scanning, this requires virtual mobile devices on two or more different testMACs, and is described in the following procedure:

1) The HSM for the active virtual mobile device switches to the Transition Start state (312). In this state, handoff is initiated. The active virtual mobile device exercises protocol mechanisms required to leave the current radio channel and switch to one more suitable. For instance, under the current WLAN standard, the active virtual mobile device would disassociate with the current AP.

2) The active virtual mobile device sends a Transition Finish command over the control network interface to the selected shadow virtual mobile device, after which, the active virtual mobile device enters the Dormant state (304). The command also contains information the shadow virtual mobile device uses to perform the handoff, including the SSID and security credentials.

3) The shadow virtual mobile device leaves the Dormant state (304) and enters the Transition Finish state (314). The shadow virtual mobile device exercises protocol mechanisms required to complete the handoff. For instance, under the current WLAN standard, the shadow virtual mobile device would associate with the new AP. The shadow virtual mobile device uses the MAC address of the first virtual mobile device as its MAC identity.

4) After completing the Transition Finish state (314), the shadow virtual mobile device enters the Active state (306), thereby becoming the new active virtual mobile device.

Figure 6:
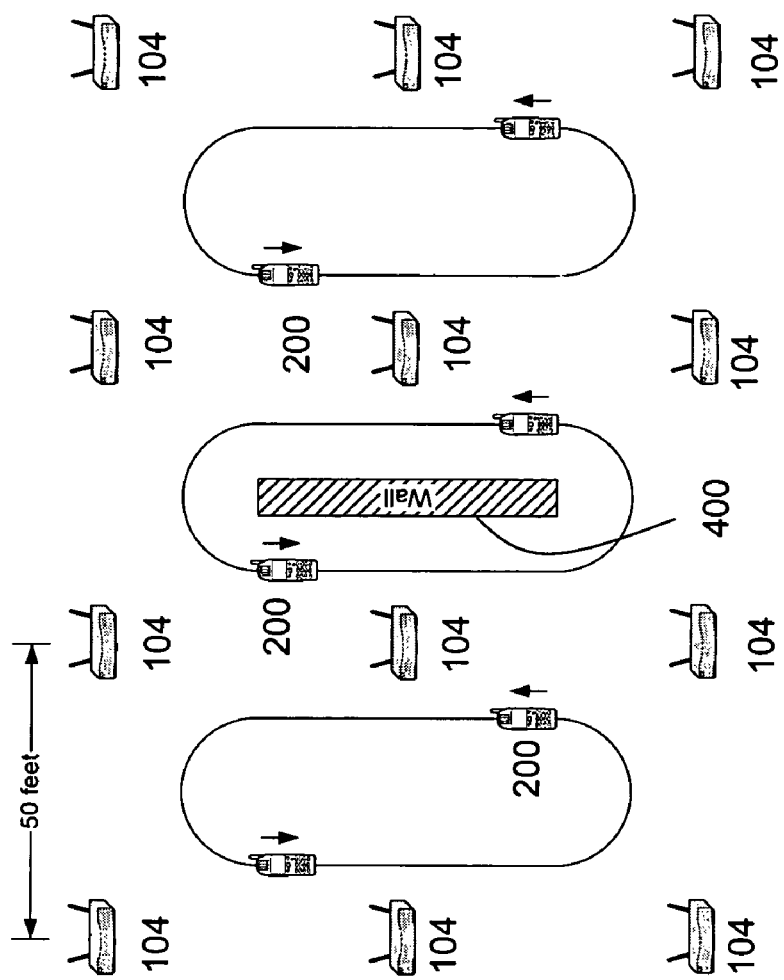
FIGS. 6 and 7 illustrate handoff scenarios that can be emulated with the test system.

Referring now to FIGS. 1 and 6, the CME (112) may include user-selectable, pre-designed network models. Each network model includes at least one physical layout representing relative positions of devices and obstructions, and a representation of the motion of individual mobile devices and obstructions over time. This allows for benchmark testing based on the pre-designed configurations. Alternately, it is possible for the CME to accept inputs in the form of detailed network models. The user can input the network model through a GUI, or may input models through a data file in a common format, such as Visio® or AutoCAD®. This enables emulation of actual installations. It is also possible to simply hard code the network model and allow the user to choose among them.

The example network model illustrated in FIG. 6 shows a number of APs (104), separated by fifty feet on a regular grid. There is a wall (400) in the middle, providing an RF as well as physical obstruction. A set of virtual mobile clients (200) follow oval paths among the APs. As time passes in the handoff emulation, the CME continuously computes the path loss between each virtual mobile device and each AP, taking into consideration distances and wall layout. The path loss values provided by the CME are then used by the testMAC to adjust signal strength. This yields a controlled and repeatable environment for exercising the handoff algorithms and measuring the performance of the wireless infrastructure.

Figure 7:
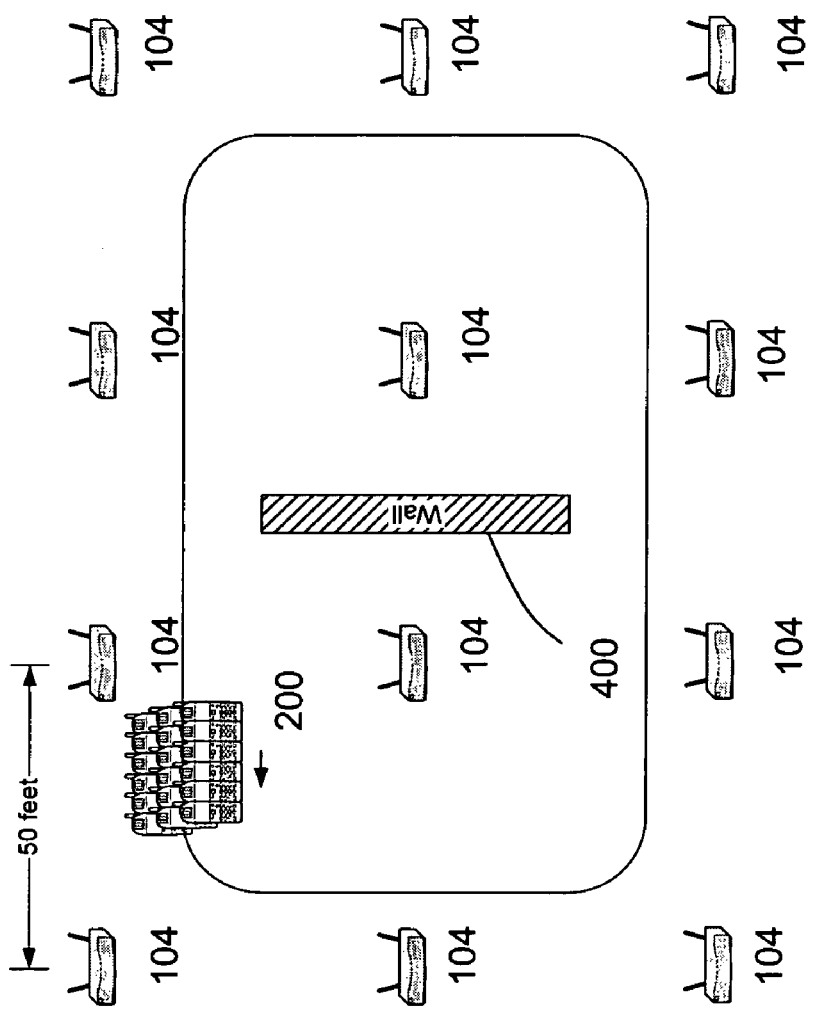

FIG. 7 depicts a layout that could be implemented as a benchmark infrastructure stress test. In the illustrated example a large number of virtual mobile devices (200) in a group move along a single path. The clients are shown physically close together for illustration purposes, but can be emulated by the test system (100 FIG. 1)) as being clustered all at the exact same physical point in space. This scenario would be useful to stress the wireless infrastructure's ability to handle many mobile devices all requiring handoff at roughly the same time. At the other extreme is the possibility that each mobile client following a "random walk". The choice of paths that emulated mobile devices can follow is limited only by the ingenuity of the user.

The network model may also be implemented with a deterministic motion plan. The CME could compute the path loss values offline for each time instant over the duration of the test period. This produces an array of path loss values for all the virtual mobile devices in relation to a given AP. Each array is loaded onto the appropriate testMACs. A simple function within the testMAC reads from the array and causes the virtual position for each virtual mobile device to be set at the appropriate time instant. This must be performed in a synchronized fashion within each testMAC so that proxy scans return accurate results from virtual mobile devices in the Dormant state. In particular, whether motion calculations are centralized in the CME, distributed, or a combination of both, and whether the motion is pre-computed or calculated in real time, the testMACs are synchronized to implement modeled events in a coordinated manner. Time synchronization features of the test system enable the CME to properly coordinate the testMACs. The activation time is a time in the near future at which the update should take effect. Because of the global synchronization provided by the test system, each testMAC can update the virtual motions at the same activation instant. In the offline motion update method the activation time is specified in the array of path loss values and effects the motion updates by the same method. Further, the network model may be configured to accept manual input in real time.

Figure 8:
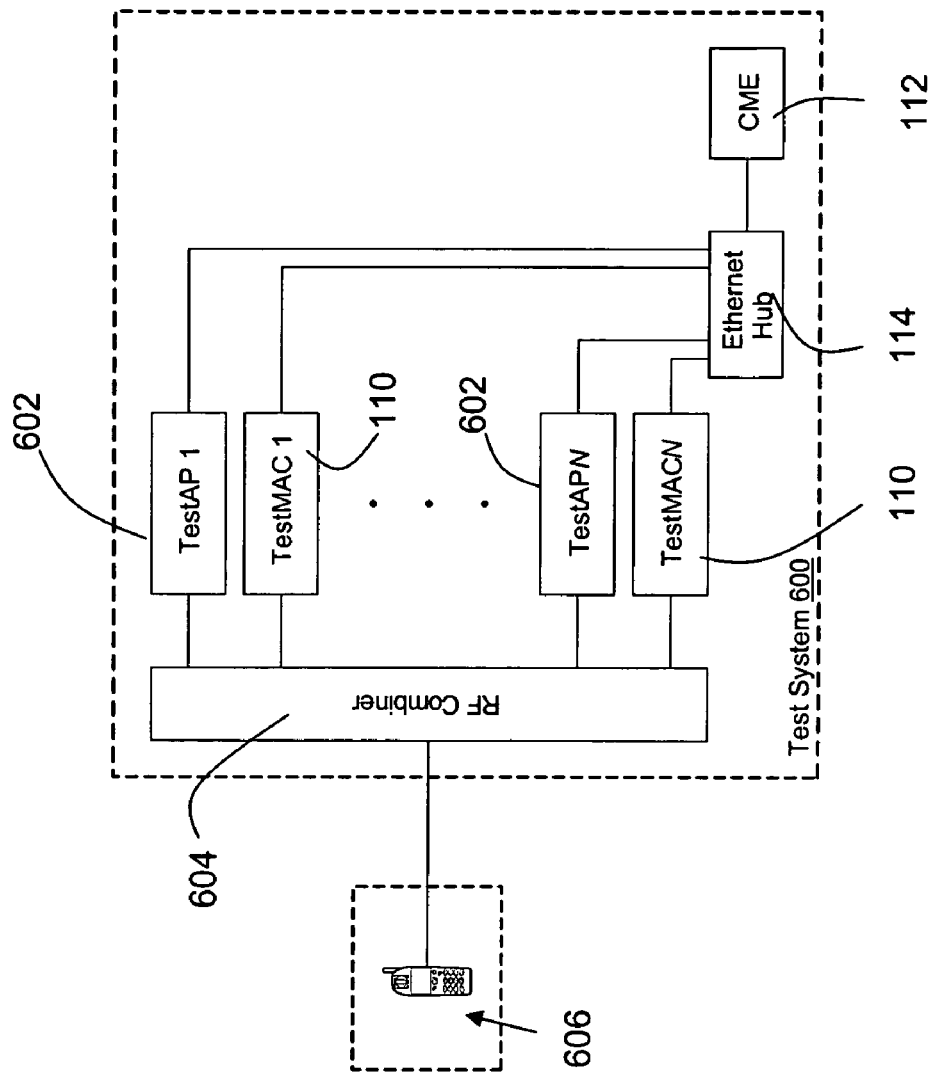
FIG. 8 illustrates a test system for client mobility testing.

Referring now to FIG. 8, a client mobility test system (600) includes a CME (112), Ethernet hub (114), a plurality of client-emulating testMACs (110), a plurality of access-point-emulating testMACs (602), and an RF combiner (604). The client mobility test system is operable to test a real mobile client Device Under Test ("DUT") (606) such as a wireless phone. The testMACs (110, 602) emulate clients and APs, respectively. The emulated APs control the mobile client's virtual position by manipulating the signal strength received by and transmitted to the mobile client. The emulated AP also implements one or more wireless LAN protocols related to security (802.11i), radio resource measurement (802.11k, v), fast handoff (802.11r), or load sharing (802.11k, Cisco CCX). These protocols can be implemented using the script engine and API described above, with the same benefits. Testing mobile clients may also be performed using real APs, but AP emulation gives a high degree of control over virtual positioning of the mobile device and of the APs with respect to each other and to the virtual mobile device. AP emulation also gives complete access to protocol manipulations, through the script engine and API, which further allows great flexibility in measuring the performance of the mobile client. However, the greatest advantage is that if security encryption is used, the testMACs emulating APs can understand what the client is transmitting since they have the keys. The CME provides mobility control and call initiation/termination control for the emulated clients in the same manner as described for the infrastructure mobility test.

In order to conduct a client mobility test, a subset of the testMACs (110) is operated as emulated APs while another subset of testMACs emulates an arbitrary number of wireless clients providing a background traffic load for each soft AP (602). The DUT (606) associates with one of the soft APs and starts operating on the wireless network. The DUT, as part of its normal operation, monitors signal strength and quality to determine whether it should perform a handoff to a more suitable AP. Each soft AP uses its virtual positioning control to set the virtual distance between itself and the DUT. This is also coordinated by the CME, which sends virtual positioning commands to the soft APs. The DUT may also collect network loading information to assist in a handoff decision. Network loading information may be obtained by the DUT either passively or actively, both of which methods can be used simultaneously by the DUT.

In a passive client mobility test the DUT monitors the network and assesses the traffic load in its current BSS. It may also monitor other radio channels to be ready for a handoff. For this reason, a realistic background traffic load is provided. A testMAC can be used with each soft AP to simulate background traffic in each BSS. Generally, it may not be necessary to generate traffic for simulation because each testMAC in the AP mode can pretend it has a certain load and respond accordingly to a request by the client under test as to the loading of the AP. However, this will not work if the client monitors the load passively. In the passive case the testMAC must generate real load. The testMACs generate the traffic load as directed by the CME's traffic load plan.

In an active client mobility test the soft AP provides the network loading information through a protocol such as CCX or 802.11k, v. The DUT may make a measurement request for the current BSS traffic load, or the soft AP may broadcast the information. The soft AP responds to this request with a measurement report containing the desired information. The softAP may also send commands per the WLAN management protocol directing the DUT to switch to a specific AP. The actual information provided by the soft AP is created by the CME as part of its traffic load plan. The DUT may also receive information about neighbor APs from the soft AP through the 802.11k protocol. This permits the mobile device to reduce the amount of time spent scanning other channels for APs.

The API and scripted language capability described above for virtual mobile device operation may also used within the soft AP. Using these features, management frames can be created and transmitted automatically or in response to queries from the mobile device. These frames implement the various features of the protocol, such as measurement reports or neighbor AP lists, as well as the handoff protocol. Furthermore, as with the Handoff State Machine, state machines specific to the infrastructure side of the protocol can be easily implemented. These state machines are designed to respond to queries from the mobile client, to respond to commands from the CME, or to initiate actions based on other inputs, such as from timers or specific trigger events. The state machines may implement aspects of the protocol, or specific non-standard behavior required for negative testing.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus operable to emulate handoff to test at least one Device Under Test in a System Under Test, comprising:

at least one test device, each test device operable to emulate operation of a plurality of wireless client devices, thereby providing virtual mobile devices; and a motion emulator including a memory with a representation of the System Under Test including, for each virtual mobile device, a model of the distance between the virtual mobile device and each Device Under Test, and a model of motion of the virtual mobile device relative to each Device Under Test, the motion emulator being operable to calculate, for each Device Under Test, an indication of path loss to be applied to communications between the virtual mobile device and the Device Under Test attributable to the modeled distance and modeled motion, and to transmit the indication of path loss to at least one test device, the test device being operable in response to the indication of path loss to apply the path loss to communications between the virtual mobile device and the Device Under Test, wherein the path loss applied to communications received by the virtual mobile device from the Device Under Test is virtually adjusted, each test device includes at least one algorithm operable to process the indication of path loss received from the motion emulator in order to virtually adjust signal strength received by each virtual mobile device, and further including an algorithm operable to prompt discard of a data unit based at least in-part on the magnitude of the indicated signal strength.

2. The apparatus of claim 1 wherein each Device Under Test is in direct communication with one test device, and wherein each test device is in direct communication with only one Device Under Test.

3. The apparatus of claim 1 wherein the path loss applied to communications received by the Device Under Test from the virtual mobile device is adjusted via a programmable attenuator.

4. The apparatus of claim 1 wherein a data unit is discarded if the path loss associated with transmission of that data unit exceeds a predetermined threshold.

5. The apparatus of claim 1 wherein a data unit is discarded if a drop probability function based at least in part on path loss indicates that the data unit is to be discarded.

6. The apparatus of claim 1 wherein the test devices are synchronized to simultaneously implement the modeled behavior of each virtual mobile device.

7. The apparatus of claim 6 wherein modeled motion is deterministic.

8. The apparatus of claim 1 further including an interface and engine operable in response to user-programmable instructions to execute a particular motion model.

9. The apparatus of claim 1 further including an interface and engine operable in response to user-programmable instructions to execute a particular layout.

10. The apparatus of claim 1 further including an interface and engine operable in response to user-programmable instructions to execute a particular communication protocol.

11. The apparatus of claim 1 further including, for each virtual mobile device, computer program code operable to implement a user-programmable handoff algorithm.

12. The apparatus of claim 1 wherein the computer program code is operable to query a Device Under Test, and initiate handoff based on a response to that query.

13. The apparatus of claim 1 wherein the computer program code is operable to initiate handoff in response to at least one of signal strength, signal quality and traffic load of a Device Under Test.

14. The apparatus of claim 1 wherein the motion emulator implements a channel model which accounts for RF absorption, reflection and diffraction by obstructions, multi-path, and free space loss.

15. The apparatus of claim 1 further including at least one test device operable to provide background traffic.

16. The apparatus of claim 15 wherein the motion emulator is operable to apply virtual motion to background traffic sources.

17. The apparatus of claim 16 wherein the motion emulator is operable to adjust background traffic characteristics.

18. A method to emulate handoff to test at least one Device Under Test in a System Under Test, comprising the steps of:

emulating, with at least one test device, operation of a plurality of wireless client devices, thereby providing virtual mobile devices; and storing, with a motion emulator including a memory, a representation of the System Under Test including, for each virtual mobile device, a model of the distance between the virtual mobile device and each Device Under Test, and a model of motion of the virtual mobile device relative to each Device Under Test, the motion emulator being operable to calculate, for each Device Under Test, an indication of path loss to be applied to communications between the virtual mobile device and the Device Under Test attributable to the modeled distance and modeled motion, and to transmit the indication of path loss to at least one test device, the test device being operable in response to the indication of path loss to apply the path loss to communications between the virtual mobile device and the Device Under Test, wherein the path loss applied to communications received by the virtual mobile device from the Device Under Test is virtually adjusted, each test device includes at least one algorithm operable to process the indication of path loss received from the motion emulator in order to virtually adjust signal strength received by each virtual mobile device, and further including an algorithm operable to prompt discard of a data unit based at least in-part on the magnitude of the indicated signal strength.

19. The method of claim 18 wherein each Device Under Test is in direct communication with one test device, and wherein each test device is in direct communication with only one Device Under Test.

20. The method of claim 18 wherein the path loss applied to communications received by the Device Under Test from the virtual mobile device is adjusted via a programmable attenuator.

21. The method of claim 18 wherein a data unit is discarded if the path loss associated with transmission of that data unit exceeds a predetermined threshold.

22. The method of claim 18 wherein a data unit is discarded if a drop probability function based at least in part on path loss indicates that the data unit is to be discarded.

23. The method of claim 18 wherein the test devices are synchronized to simultaneously implement the modeled behavior of each virtual mobile device.

24. The method of claim 23 wherein modeled motion is deterministic.

25. The method of claim 18 further including an interface and engine operable in response to user-programmable instructions to execute a particular motion model.

26. The method of claim 18 further including an interface and engine operable in response to user-programmable instructions to execute a particular layout.

27. The method of claim 18 further including an interface and engine operable in response to user-programmable instructions to execute a particular communication protocol.

28. The method of claim 18 further including, for each virtual mobile device, computer program code operable to implement a user-programmable handoff algorithm.

29. The method of claim 18 wherein the computer program code is operable to query a Device Under Test, and initiate handoff based on a response to that query.

30. The method of claim 18 wherein the computer program code is operable to initiate handoff in response to at least one of signal strength, signal quality and traffic load of a Device Under Test.

31. The method of claim 18 wherein the motion emulator implements a channel model which accounts for RF absorption, reflection and diffraction by obstructions, multi-path, and free space loss.

32. The method of claim 18 further including at least one test device operable to provide background traffic.

33. The method of claim 32 wherein the motion emulator is operable to apply virtual motion to background traffic sources.

34. The method of claim 33 wherein the motion emulator is operable to adjust background traffic characteristics.

35. Apparatus operable to evaluate handoff to test at least one Device Under Test in a System Under Test, comprising:
 a plurality of test devices, each test device operable to emulate operation of a plurality of wireless access points, thereby providing virtual access points; and
 a motion emulator including a memory with a representation of the System Under Test including, for each virtual access point, a modeled distance between that virtual access point and each Device Under Test, and a modeled motion of that virtual access point relative to each Device Under Test,
 the motion emulator being operable to calculate, for each Device Under Test, an indication of path loss to be applied to communications between that Device Under Test and the virtual access point attributable to the modeled distance and modeled motion, and to transmit the indication of path loss to at least one test device,
 the test device being operable in response to the indication of path loss to apply the path loss to communications between that Device Under Test and the virtual access point,
 wherein the path loss applied to communications received by a virtual access point from a Device Under Test is virtually adjusted, each test device includes at least one algorithm operable to process the indication of path loss received from the motion emulator in order to virtually adjust signal strength received by each virtual access point, and further including an algorithm operable to prompt discard of a data unit based at least in-part on the magnitude of the indicated signal strength.

36. The apparatus of claim 35 wherein each Device Under Test is in direct communication with a plurality of test devices via an RF combiner.

37. The apparatus of claim 35 further including at least one test device operable to emulate operation of at least one wireless client device, thereby providing background traffic.

38. The apparatus of claim 35 wherein the path loss applied to communications received by a Device Under Test from a virtual access point is adjusted via a programmable attenuator.

39. The apparatus of claim 35 wherein a data unit is discarded if the path loss associated with transmission of that data unit exceeds a predetermined threshold.

40. The apparatus of claim 39 wherein a data unit is discarded if a drop probability function based at least in part on path loss indicates that the data unit is to be discarded.

41. The apparatus of claim 35 wherein the test devices are synchronized to simultaneously implement modeled conditions for a particular point in time.

42. The apparatus of claim 35 wherein at least one virtual access point is operable to respond to a request from a Device Under Test.

43. The apparatus of claim 35 wherein at least one virtual access point is operable to monitor and record Device Under Test functions.

44. The apparatus of claim 37 wherein the motion emulator is operable to apply virtual motion to background traffic sources.

45. The apparatus of claim 37 wherein the motion emulator is operable to adjust background traffic characteristics.

46. A method to evaluate handoff to test at least one Device Under Test in a System Under Test, comprising the steps of:
 emulating, with ones of a plurality of test devices, operation of a plurality of wireless access points, thereby providing virtual access points; and
 storing, with a motion emulator including a memory, a representation of the System Under Test including, for each virtual access point, a modeled distance between that virtual access point and each Device Under Test, and a modeled motion of that virtual access point relative to each Device Under Test,
 the motion emulator being operable to calculate, for each Device Under Test, an indication of path loss to be applied to communications between that Device Under Test and the virtual access point attributable to the modeled distance and modeled motion, and to transmit the indication of path loss to at least one test device,
 the test device being operable in response to the indication of path loss to apply the path loss to communications between that Device Under Test and the virtual access point,
 wherein the path loss applied to communications received by a virtual access point from a Device Under Test is virtually adjusted, each test device includes at least one algorithm operable to process the indication of path loss received from the motion emulator in order to virtually adjust signal strength received by each virtual access point, and further including an algorithm operable to prompt discard of a data unit based at least in-part on the magnitude of the indicated signal strength.

47. The method of claim 46 wherein each Device Under Test is in direct communication with a plurality of test devices via an RF combiner.

48. The method of claim 47 further including at least one test device operable to emulate operation of at least one wireless client device, thereby providing background traffic.

49. The method of claim 46 wherein the path loss applied to communications received by a Device Under Test from a virtual access point is adjusted via a programmable attenuator.

50. The method of claim 46 wherein a data unit is discarded if the path loss associated with transmission of that data unit exceeds a predetermined threshold.

51. The method of claim 50 wherein a data unit is discarded if a drop probability function based at least in part on path loss indicates that the data unit is to be discarded.

52. The method of claim 46 wherein the test devices are synchronized to simultaneously implement modeled conditions for a particular point in time.

53. The method of claim 46 wherein at least one virtual access point is operable to respond to a request from a Device Under Test.

54. The method of claim 46 wherein at least one virtual access point is operable to monitor and record Device Under Test functions.

55. The method of claim 48 wherein the motion emulator is operable to apply virtual motion to background traffic sources.

56. The method of claim 48 wherein the motion emulator is operable to adjust background traffic characteristics.

57. Apparatus operable to test at least one Device Under Test in a System Under Test, comprising:
- at least one test device, each test device operable to emulate behavior of at least one wireless client device;
- at least one programmable emulator that allows a user to control the emulated wireless client device; and
- at least one filter operable to intercept a data unit at any layer of the protocol stack.

58. The apparatus of claim 57 wherein the programmable emulator includes a command line interpreter.

59. The apparatus of claim 57 wherein the behavior of the at least one virtual mobile device is specified by a user-programmable state machine.

60. The apparatus of claim 57 wherein a user accessible language interpreter allows the user to:
- specify behavior of at least one virtual mobile device; and
- specify at least one parameter to be monitored.

61. The apparatus of claim 57 wherein the intercepted data unit is processed by the programmable emulator.

62. The apparatus of claim 61 wherein the processed data unit is reinserted into the stack for the purpose of testing the protocol implementation of the Device Under Test (DUT).

63. A method to test at least one Device Under Test in a System Under Test, comprising the steps of:
- emulating, with at least one test device, behavior of at least one wireless client device;
- allowing, via at least one programmable emulator, a user to control the emulated wireless client device; and
- intercepting a data unit at any layer of the protocol stack using at least one filter.

64. The method of claim 63 wherein the programmable emulator includes a command line interpreter.

65. The method of claim 63 wherein the behavior of the at least one virtual mobile device is specified by a user-programmable state machine.

66. The method of claim 63 wherein a Tool Command Language allows the user to:
- specify behavior of at least one virtual mobile device; and
- specify at least one parameter to be monitored.

67. The method of claim 63 wherein the intercepted data unit is processed by the programmable emulator.

68. The method of claim 67 wherein the processed data unit is reinserted into the stack for the purpose of testing the protocol implementation of the DUT.

* * * * *